US009836650B2

(12) United States Patent
Ur et al.

(10) Patent No.: US 9,836,650 B2
(45) Date of Patent: Dec. 5, 2017

(54) IDENTIFICATION OF A PHOTOGRAPHER BASED ON AN IMAGE

(71) Applicant: EMPIRE TECHNOLOGY DEVELOPMENT LLC, Wilmington, DE (US)

(72) Inventors: Shmuel Ur, Galil (IL); Gad Shlomo Sheaffer, Haifa (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 65 days.

(21) Appl. No.: 14/617,165

(22) Filed: Feb. 9, 2015

(65) Prior Publication Data

US 2016/0232671 A1     Aug. 11, 2016

(51) Int. Cl.
*G06K 9/46* (2006.01)
*G06K 9/00* (2006.01)

(52) U.S. Cl.
CPC ............ *G06K 9/00664* (2013.01); *G06K 2009/00583* (2013.01); *G06K 2209/27* (2013.01)

(58) Field of Classification Search
None
See application file for complete search history.

(56) References Cited

U.S. PATENT DOCUMENTS 7,583,275 B2 * 9/2009 Neumann ............... G06T 17/00
345/419
8,326,037 B1 * 12/2012 Abitz .................... G06K 7/1443
235/462.01

8,358,358 B2   1/2013 Gallagher et al.
8,406,531 B2   3/2013 Ramanujapuram et al.
8,497,912 B2   7/2013 Wun
(Continued)

FOREIGN PATENT DOCUMENTS

JP   2009199322 A   9/2009
JP   2012230714 A   11/2012
JP   2013192154 A   9/2013

OTHER PUBLICATIONS

"Scale-invariant feature transform," accessed at https://web.archive.org/web/20140531113141/https://en.wikipedia.org/wiki/Scale-invariant_feature_transform, Last modified on May 19, 2014, pp. 14.
(Continued)

*Primary Examiner* — Iman K Kholdebarin
(74) *Attorney, Agent, or Firm* — Moritt Hock & Hamroff LLP; Steven S. Rubin, Esq.

(57) ABSTRACT

Technologies are generally described for methods and systems effective to identify a photographer of an image based on the image. The image may correspond to image data generated by a device. In an example, a processor may identify feature data in the image data. The feature data may correspond to a static feature in real space. The processor may also determine a position of the photographer based on the identified feature data. The processor may also retrieve video data from a memory. The video data may include the feature data. The processor may also determine a time that may correspond to the generation of the image data. The determination of the time may be based on the video data. The processor may also identify the photographer based on the position and based on the time.

23 Claims, 8 Drawing Sheets

(56) References Cited

U.S. PATENT DOCUMENTS

| | | | |
|---|---|---|---|
| 8,730,354 B2* | 5/2014 | Stafford | H04N 5/272 |
| | | | 348/239 |
| 8,755,568 B2* | 6/2014 | Adhikari | G06F 3/017 |
| | | | 382/103 |
| 8,971,577 B2 | 3/2015 | Lao et al. | |
| 9,167,289 B2* | 10/2015 | Stinson, III | H04N 21/4223 |
| 2005/0215879 A1* | 9/2005 | Chuanggui | G06T 7/001 |
| | | | 600/407 |
| 2009/0076936 A1* | 3/2009 | Wright | G06Q 30/00 |
| | | | 705/34 |
| 2010/0048242 A1* | 2/2010 | Rhoads | G06F 17/30244 |
| | | | 455/556.1 |
| 2012/0050154 A1* | 3/2012 | Jagmag | G06F 3/011 |
| | | | 345/156 |
| 2012/0092327 A1* | 4/2012 | Adhikari | H04N 13/007 |
| | | | 345/419 |
| 2013/0156343 A1* | 6/2013 | Hutchings | G06T 7/00 |
| | | | 382/286 |
| 2013/0177248 A1 | 7/2013 | Shuster | |
| 2013/0342573 A1* | 12/2013 | Leazenby | G06T 11/60 |
| | | | 345/633 |
| 2014/0002342 A1 | 1/2014 | Fedorovskaya et al. | |
| 2015/0206347 A1* | 7/2015 | Russell | H04N 5/23229 |
| | | | 348/360 |
| 2016/0014350 A1* | 1/2016 | Osman | H04N 5/2621 |
| | | | 348/239 |
| 2016/0110878 A1* | 4/2016 | Chang | G06T 7/73 |
| | | | 382/103 |
| 2016/0127690 A1* | 5/2016 | Kaehler | G06T 19/003 |
| | | | 348/143 |
| 2016/0209648 A1* | 7/2016 | Haddick | G02B 27/0093 |
| 2016/0227181 A1* | 8/2016 | Ilic | G06K 9/228 |

OTHER PUBLICATIONS

Castillo, M., "Seattle restaurant bans Google Glass wearers," accessed at https://web.archive.org/web/20140221015001/http://www.cbsnews.com/news/seattle-restaurant-bans-google-glass-wearers/, accessed on Nov. 28, 2013, pp. 5.

Cohan, P., "Does Google Glass Violate Community Standards?," accessed at http://web.archive.org/web/20140327215026/http://www.forbes.com/sites/petercohan/2013/05/07/does-google-glass-violate-community-standards/, May 7, 2013, pp. 4.

Gee, M., "The Google Glass Privacy Debate: What's Real & What's Overblown Hype," accessed at https://web.archive.org/web/20140808114839/http://marketingland.com/the-google-glass-privacy-debate-whats-real-whats-overblown-hype-50745, Jul. 5, 2013, pp. 5.

Hamada, S., et al., Pose Estimation of a Mobile Camera by using Environmental Cameras for MR, IPSJ SIG Technical Reports, IPS, vol. 2008, No. 115, pp. 109-116 (Nov. 27, 2008).

Hiroshi, I., et al., Localization Using Mobile Phone and Image Matching, IEICE Technical Reports, IEICE, vol. 112, No. 434, pp. 215-220 (Feb. 18, 2013) [Abstract].

* cited by examiner

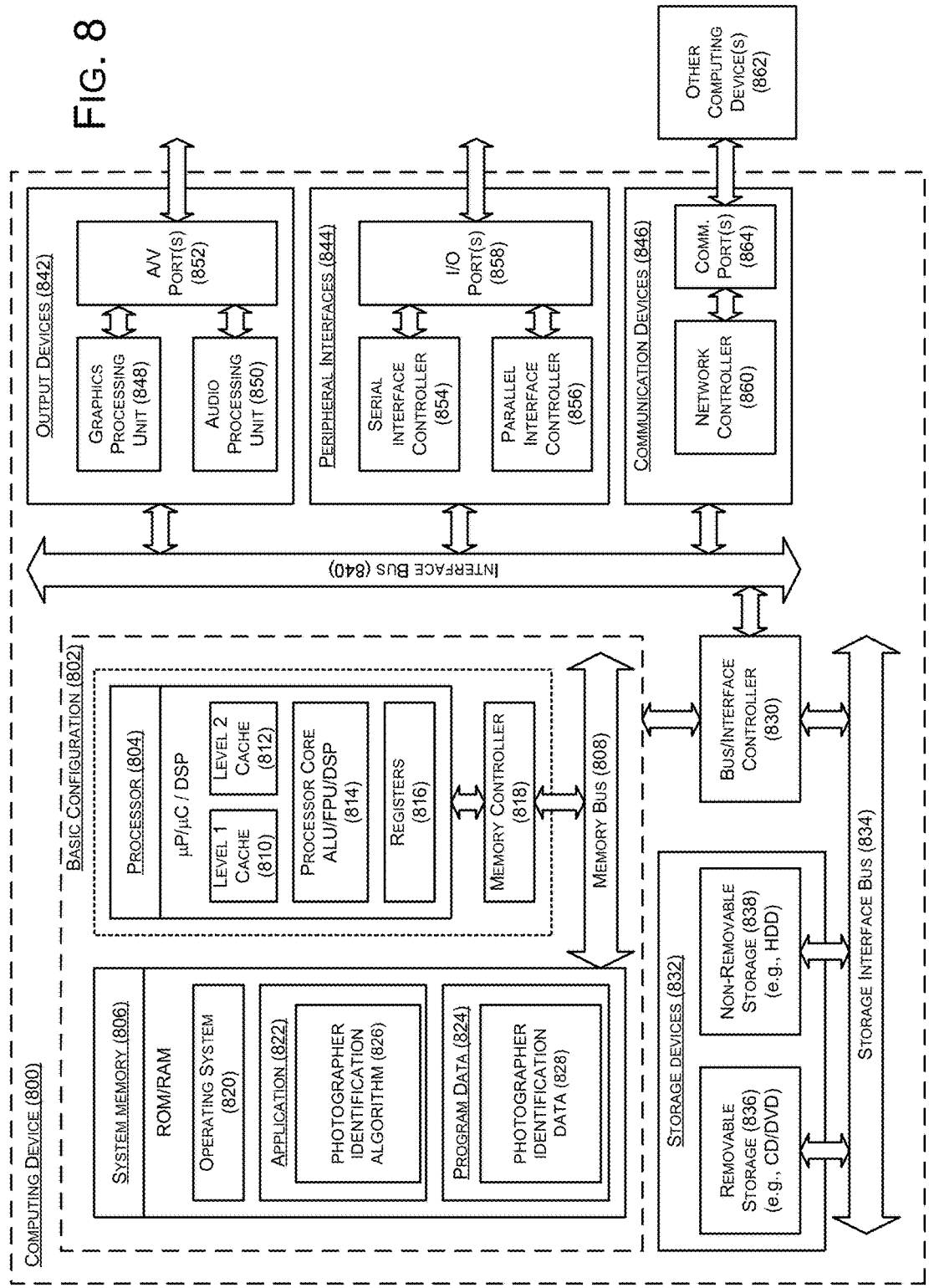

IDENTIFICATION OF A PHOTOGRAPHER BASED ON AN IMAGE

BACKGROUND

Unless otherwise indicated herein, the materials described in this section are not prior art to the claims in this application and are not admitted to be prior art by inclusion in this section.

A visitor to a location, such as a restaurant, may use a device that may include a camera to capture an image inside of the location. The image may include objects, such as people or decorations, inside of the location. In some examples, the visitor may share the image, such as by distributing the image on the Internet, without consent from a related entity such as the people shown by the image, or the owner of the decorations shown by the image.

SUMMARY

In some examples, methods to identify a photographer based on an image are generally described. The image may correspond to image data generated by a device. The methods may include identifying, by a processor, feature data in the image data. The feature data may correspond to a static feature in real space. The methods may also include determining, by a processor, a position of the photographer based on the identified feature data. The methods may also include retrieving, by a processor, video data from a memory. The video data may include the feature data. The methods may also include determining, by a processor, a time that may correspond to the generation of the image data. The determination of the time may be based on the video data. The methods may also include identifying, by a processor, the photographer based on the position and based on the time.

In some examples, systems effective to identify a photographer based on an image are generally described. The image may correspond to image data generated by a device. The system may comprise a video device that may be configured to generate video data. The system may also include a memory that may be configured to store the video data. The system may also include a processor that may be configured to be in communication with the memory and the video device. The processor may be configured to identify feature data in the image data. The feature data may correspond to a static feature in real space. The processor may also be configured to determine a position of the photographer based on the identified feature data. The processor may also be configured to retrieve the video data from the memory. The video data may include the feature data. The processor may also be configured to determine a time that may correspond to the generation of the image data. The determination of the time may be based on the video data. The processor may also be configured to identify the photographer based on the position and based on the time.

In some examples, devices effective to identify a photographer based on an image are generally described. A first device may be configured to identify a photographer based on the image. The image may correspond to image data generated by a second device. The first device may include a memory and a processor. The processor may be configured to be in communication with the memory. The processor may be configured to receive video data. The processor may also be configured to store the video data in the memory. The processor may also be configured to identify feature data in the image data. The feature data may correspond to a static feature in real space. The processor may also be configured to determine a position of the photographer based on the identified feature data. The processor may also be configured to subtract the feature data from the image data to identify object data in the image data. The object data may correspond to a dynamic object in the real space. The processor may also be configured to compare the object data with the video data. The processor may also be configured to, based on the comparison of the object data with video data, identify video image data in the video data. The video image data may include the object data. The processor may also be configured to determine a time that may correspond to the generation of the image data. The determination of the time may be based on the identified video image data. The processor may also be configured to identify the photographer based on the position and based on the time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that is arranged to implement identification of a photographer based on an image, all arranged according to at least some embodiments described herein.

DETAILED DESCRIPTION

Figure 1:
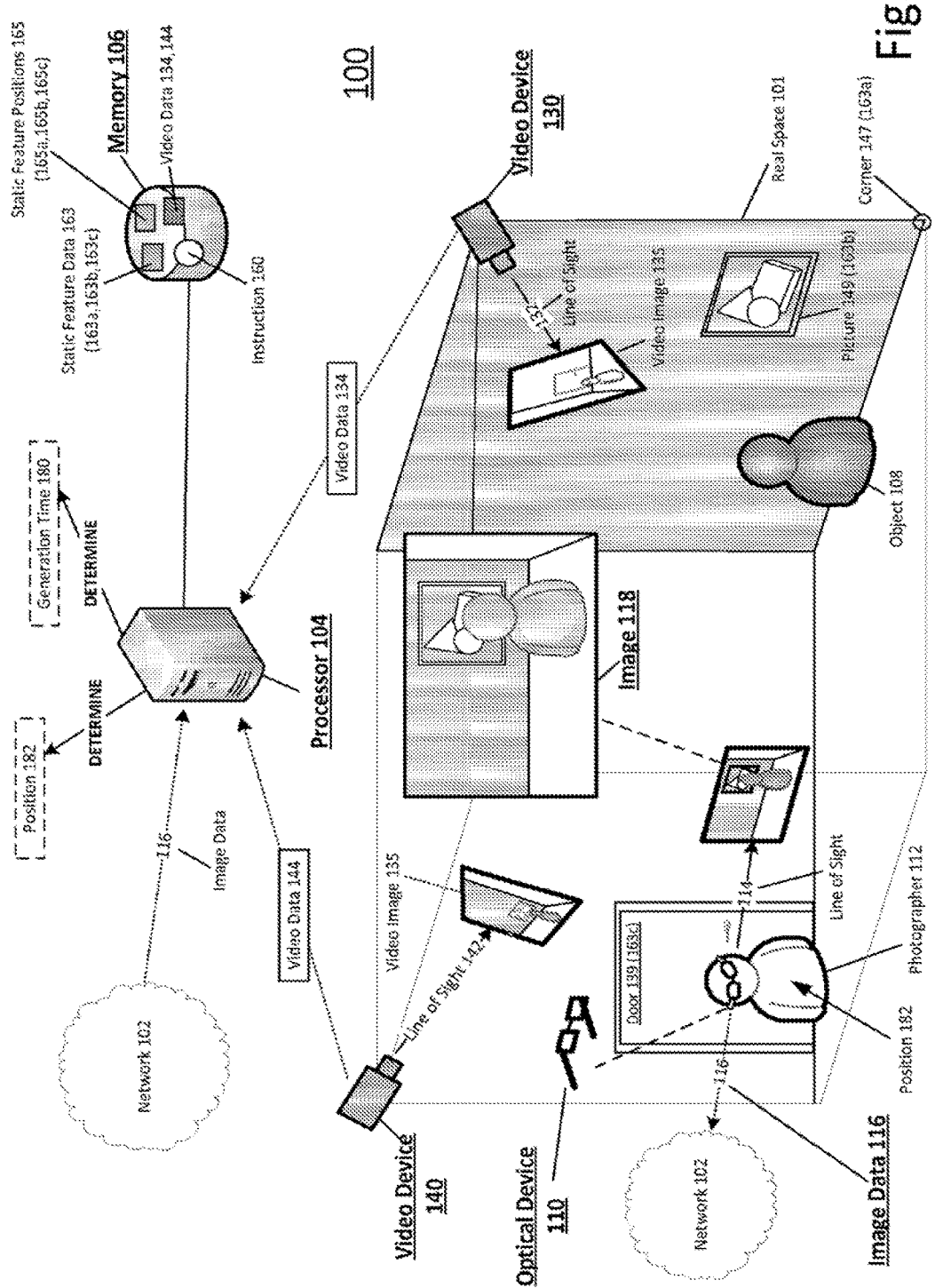
FIG. 1 illustrates an example system that can be utilized to implement identification of a photographer based on an image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to identification of a photographer of an image based on the image.

Briefly stated, technologies are generally described for methods and systems effective to identify a photographer of an image based on the image viewable by a user, such as an image posted on a social media web site. The viewable image may correspond to image data generated by a device (e.g., a device capable of taking an image). For example, the viewable image may be produced based on an application of image processing techniques on the image data. In some examples, the image may be an image of an interior of a location such as a restaurant, where the image may show one or more visitors to the location. The photographer may control the device to generate the image data at a position and at a time. In an example, a processor may receive the image data and in response, may identify feature data in the image data. The feature data may correspond to a static feature in real space. For example, a location such as a restaurant may include static features such as a particular colored wall, decoration, furniture, etc. Identification of the feature data in the image data may include comparing the image data with static feature data that may be associated with the static feature. The processor may determine the position of the photographer based on the identified feature data. The processor may identify object data in the image data, where the object data may be associated with a dynamic object shown in the image. For example, the image may show a visitor to the location, where the visitor may be a dynamic object. The processor may retrieve video data from a memory, where the video data may include the feature data. The processor may determine the time that may correspond to the generation of the image data. The determination of the time may be based on the video data, such as, for example, by a comparison of the identified object data with the video data. The processor may identify the photographer based on the position and based on the time. For example, the processor may identify a video image of a piece of video data that may include a display of the photographer.

FIG. 1 illustrates an example system 100 that can be utilized to implement identification of a photographer based on an image, arranged in accordance with at least some embodiments described herein. System 100 may be implemented within a real space 101 such as a restaurant, a park, a museum, etc. System 100 may include a processor 104, a memory 106, and/or one or more video devices 130, 140. In an example, processor 104 may receive image data 116 that may correspond to an image 118. For example, image 118 may be viewable by a user and produced based on an application of image processing techniques on image data 116. Image data 116 may be generated by an optical device 110, which may be a camera or an augmented reality device configured to generate image data 116. Optical device 110 may be associated with a photographer 112, such as being controlled by photographer 112, to generate image data 116. Processor 104 may be configured to determine a position 182 of photographer 112 at a generation time 180, where generation time 180 may be a time in which image data 116 was generated by optical device 110. Video devices 130, 140 may each be a video camera configured to generate video data 134, 144, respectively (further described below). Video data 134, 144 may each correspond to a video, and may each include one or more video images (further described below). Processor 104 may be further configured to determine generation time 180 of image data 116 based on position 182, and/or video data 134, 144. Photographer 112 may be identified based on generation time 180 and based on position 182, which will be described in more detail below.

In an example, at generation time 180, photographer 112 may use optical device 110 to observe an object 108, through a line of sight 114. Object 108 may be a dynamic object such as a person that may be moving. Photographer 112 may be located at position 182 at generation time 180, and may use optical device 110 to generate image data 116. Generation time 180 may be a particular day of a week, a date, a time, etc. Image data 116 may correspond to image 118, which may include an image of object 108. Photographer 112 may distribute image data 116 in or via a network 102, such as the Internet, or a social media network. Photographer 112 may distribute image data 116 in network 102 at a time later than generation time 180, such as a few hours later, or a few days later, etc. In the example, processor 104 may receive image data 116 through network 102 after image data 116 is distributed in network 102. In some examples, where object 108 may be a person, object 108 may obtain image data 116 from network 102, and may provide image data 116 to processor 104. In some examples, an administrator of real space 101 may obtain image data 116 from network 102, and may provide image data 116 to processor 104. Processor 104, in response to receiving image data 116, may store image data 116 in memory 106 and may determine position 182 of photographer 112 at generation time 180 based on image data 116, and may determine generation time 180 based on position 182. With generation time 180 and position 182 determined, video devices 130, 140 may be used to identify photographer 112.

Processor 104, memory 106, and/or video devices 130, 140 may be configured to be in communication with each other. In some examples, processor 104 and/or memory 106 may be housed in a same device. In some examples, video devices 130, 140 may each be a surveillance camera of real space 101 configured to observe one or more sections of real space 101. Memory 106 may be configured to store an instruction 160, which may include instructions effective to instruct processor 104 to determine generation time 180, and to determine position 182. In some examples, processor 104, memory 106, and video devices 130, 140 may be inside of real space 101.

In the example, real space 101 may include static features such as a door 139, a corner 147, a picture 149, etc. Video device 130 may be configured to monitor a first section of real space 101 through a line of sight 132. Based on line of sight 132, video data 134 generated by video device 130 may correspond to a display of door 139. Video device 140 may be configured to monitor a second section of real space 101 through a line of sight 142. Based on line of sight 142, video data 144 generated by video device 140 may correspond to a display of corner 147 and picture 149. Processor 104 may be configured to analyze video data 134, 144, to generate a set of static feature data 163 (including static feature data 163a, 163b, 163c). Static feature data 163 may be portions of video data 134, 144, that may correspond to static features of real space 101. In some examples, static features of real space 101 may correspond to portions of video data that may remain at a same point within each video image of the video data (further described below). Such static features may be understood as a background, or fixture, in real space 101. Processor 104 may be further configured to store static feature data 163 in memory 106.

Memory 106 may be further configured to store static feature positions 165 (including static feature positions 165*a*, 165*b*, 165*c*) that may be effective to indicate positions of static features, such as corner 147, picture 149, and door 139, in real space 101. Static feature positions 165 may be represented based on a Cartesian coordinate system, a grid system, etc. In some example, static feature positions 165 may be input by an administrator of system 100, or by personnel associated with real space 101. In some examples, system 100 may be effective to survey real space 101 with use of video devices 130, 140, and processor 104 may be configured to determine static feature positions 165 based on the survey.

Processor 104, based on instruction 160 and image data 116, may determine position 182 of optical device 110 at generation time 180. Determination of position 182 may be based on a comparison between image data 116 with static feature data 163, and may be based on static feature positions 165. In some examples, comparison of image data 116 with static feature data 163 may include comparison of one or more portions of image data 116 with static feature data 163. In some examples, the portions of image data 116 to be used for comparison may be identified based on image processing techniques such as edge detection techniques. As will be described in more detail below, processor 104 may be configured to determine generation time 180 based on position 182 and based on video data 134, 144. In response to determination of generation time 180, processor 104 may identify a video image 135 within video data 134, where video image 135 may include an image of photographer 112 and/or optical device 110. As a result of identifying video image 135, photographer 112 may be identified such as by processor 104, or by a user of system 100 who may wish to identify photographer 112.

Figure 2:
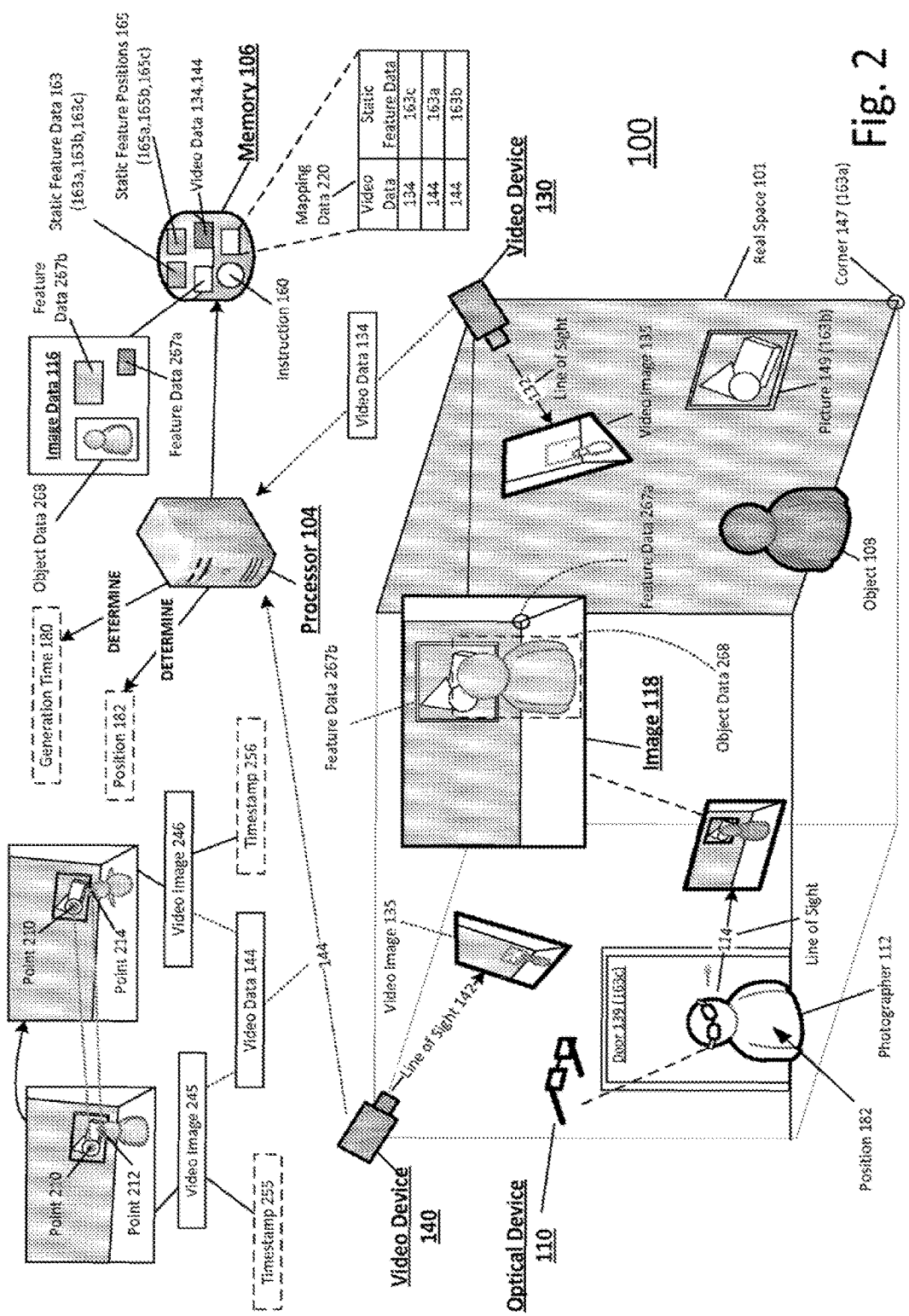
FIG. 2 illustrates the example system of FIG. 1 with additional detail relating to static feature data and mapping data.

FIG. 2 illustrates the example system 100 of FIG. 1 with additional detail relating to static feature data and mapping data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Processor 104 may be configured to generate static feature data 163 based on video data 134, 144. Processor 104 may compare features in image 118 with static features in real space 101. More specifically, processor 104 may identify feature data 267 (including feature data 267*a*, 267*b*) in image data 116 based on a comparison of image data 116 with static feature data 163 stored in memory 106. Determination of position 182 of photographer 112 may be based on feature data 267 identified from image data 116. Processor 104 may be configured to select a video stream, or identify video data among video data 134, 144, in order to determine generation time 180. Identification of video data among video data 134, 144, may be based on an analysis of mapping data 220, which will be described in more detail below.

In the example, video data 144 may include one or more video images, such as video images 245, 246. When video data 144 is outputted on a display, video images 245, 246 may be displayed sequentially based on a timestamp associated with each video image. For example, video image 245 may be associated with a timestamp 255, which may indicate that video image 245 may have been generated by video device 140 at an instance of time indicated by timestamp 255. Video image 246 may be associated with a timestamp 256, which may indicate that video image 246 may have been generated by video device 140 at an instance of time indicated by timestamp 256. An output of video data 144 on a display may display video image 245 before video image 246 if timestamp 255 indicates an earlier time compared to the time indicated by timestamp 256.

As the output of video data 144 progresses from video image 245 to video image 246, particular portions of video data 144, such as data associated with displays of corner 147 and picture 149, may remain at a same point of video data 144. A point of video data 144 may be a particular pixel position, or a particular section, of video data 144. For example, a portion of image data 116 associated with picture 149 may be at point 210 of video data 144. As video data 144 progresses from video image 245 to video image 246, the portion of image data 116 associated with picture 149 may remain at point 210 of video data 144. Similarly, as video data 144 progresses from video image 245 to video image 246, a portion of video data 144 associated with object 108 may change from point 212 to point 214. Processor 104 may determine that the portion of video data 144 at point 210 may indicate a static feature of real space 101 and in response, may identify the particular portion of video data 144 as static feature data 163. In the example, processor 104 may identify a first portion of video data 144 as static feature data 163*a*, which may represent corner 147, and a second portion of video data 144 as static feature data 163*b*, which may represent picture 149. Similarly, processor 104, based on video data 134, may identify static feature data 163 that may represent door 139. In some examples, processor 104 may determine a difference between video images 245, 246, such as by subtracting video image 246 from video image 245. Processor 104 may be further configured to identify feature data 267 based on the difference between video images 245, 246.

Memory 106 may be further configured to store mapping data 220, which may be data effective to indicate correspondences between pieces of static feature data 163 and video data 134, 144. For example, mapping data 220 may indicate that video device 130 records, or generates, video data 134, that includes door 139—corresponding to static feature data 163*c*. Processor 104 may be further configured to generate and/or update mapping data 220, with use of static feature data 163. Mapping data 220 may include data effective to indicate that video data 134 may correspond to static feature data 163*c* (door 139). Mapping data 220 may further include data effective to indicate video data 144 may correspond to static feature data 163*b*, 163*c* (corner 147 and picture 149). Mapping data 220 may be analyzed by processor 104 to identify video data as will be described in more detail below.

In the example, processor 104 may determine position 182 by identifying feature data 267 (including feature data 267*a*, 267*b*) in image data 116. Identification of feature data 267 may be based on a comparison between image data 116 with static feature data 163. For example, processor 104 may execute edge detection techniques to identify a portion of image data 116, such as a portion located at point 210 of video data 144. Processor 104 may compare the identified portion at point 210 with static feature data 163 and may determine that the identified portion matches with static feature data 163*b*. Processor 104 may identify the matching portion of image data 116 as feature data 267*b*. In the example, processor 104, based on the identification of feature data 267*b*, may determine that image 118 displays an image of picture 149. Similarly, processor 104, based on the identification of feature data 267*a*, may determine that image 118 displays an image of corner 147. Processor 104 may determine that image 118 does not display an image of door 139 based on a lack of portion of image data 116 that matches static feature data 163*c*. Processor 104 may determine position 182 of photographer 112 based on feature data 267 in image data 116, and based on static feature positions 165, which will be described in more detail below.

Based on the determination that image 118 includes a display of corner 147 and picture 149, processor 104 may determine that image data 116 includes feature data 267*a*, 267*b*, which may resemble static feature data 163*a*, 163*b*. Processor 104 may analyze mapping data 220 to identify video data 144 (from among video data 134, 144) based on a correspondence between video data 144 and static feature data 163*a*, 163*b*. In response to the identification of video data 144, processor 104 may retrieve video data 144 from memory 106.

Processor 104 may be configured to subtract feature data 267 from image data 116 to identify object data 268 from image data 116. In some examples, image data 116 may include augmented reality object data, and image 118 may display augmented reality objects associated with the augmented reality object data. Processor 104 may be configured to subtract feature data 267 and the augmented reality object data from image data 116 in order to identify object data 268. Object data 268 may correspond to an image of object 108. In some examples, object data 268 may include facial data associated with object 108, such as image data of a face of a person. Memory 106 may be further configured to store a database that may include stored facial data of frequent visitors to real space 101, and processor 104 may identify object data 268 based on an application of image processing techniques, such as facial recognition techniques, to the facial data associated with object 108 and the stored facial data in memory 106.

In response to identification of object data 268 and the identification of video data 144, processor 104 may compare object data 268 with video data 144. Comparison of object data 268 with video data 144 may cause processor 104 to identify video images of video data 144 that may include at least a portion of object data 268. In the example, as a result of identifying video images of video data 144, processor 104 may determine generation time 180 based on the identified video images (further described below). In some examples, video data 144 may be first video data and mapping data 220 may indicate that a second video data, different from video data 144, may correspond to static feature data 163*a*, 163*b*. Processor 104 may retrieve the second video data from memory 106 and may compare object data 268 with the second video data. Processor 104 may identify video images in the second video data, which may include at least a portion of object data 268, and may determine generation time 180 based on video data 144 and the second video data, such as by combining the first and second video data to form a virtual camera feed (further described below).

When position 182 of photographer 112 and generation time 180 of image data 116 have been determined, system 100 may identify photographer 112. As will be described in more detail below, in response to determination of generation time 180, processor 104 may compare position 182 with static feature positions 165 stored in memory 106. In the example, processor 104 may determine that position 182 is relatively close to static feature position 165*c*, which may be a position of door 139 in real space 101. Processor 104 may analyze mapping data 220 to determine which video data among video data 134, 144, may correspond to feature data 267*c*, or door 139. In the example, processor 104 may determine that video data 134 may correspond to feature data 267*c*, and in response, may search for a video image within video data 134 that may be associated with a timestamp equivalent to generation time 180. In the example, video image 135 of video data 134 may be associated with generation time 180 and may include a display of photographer 112.

Figure 3:
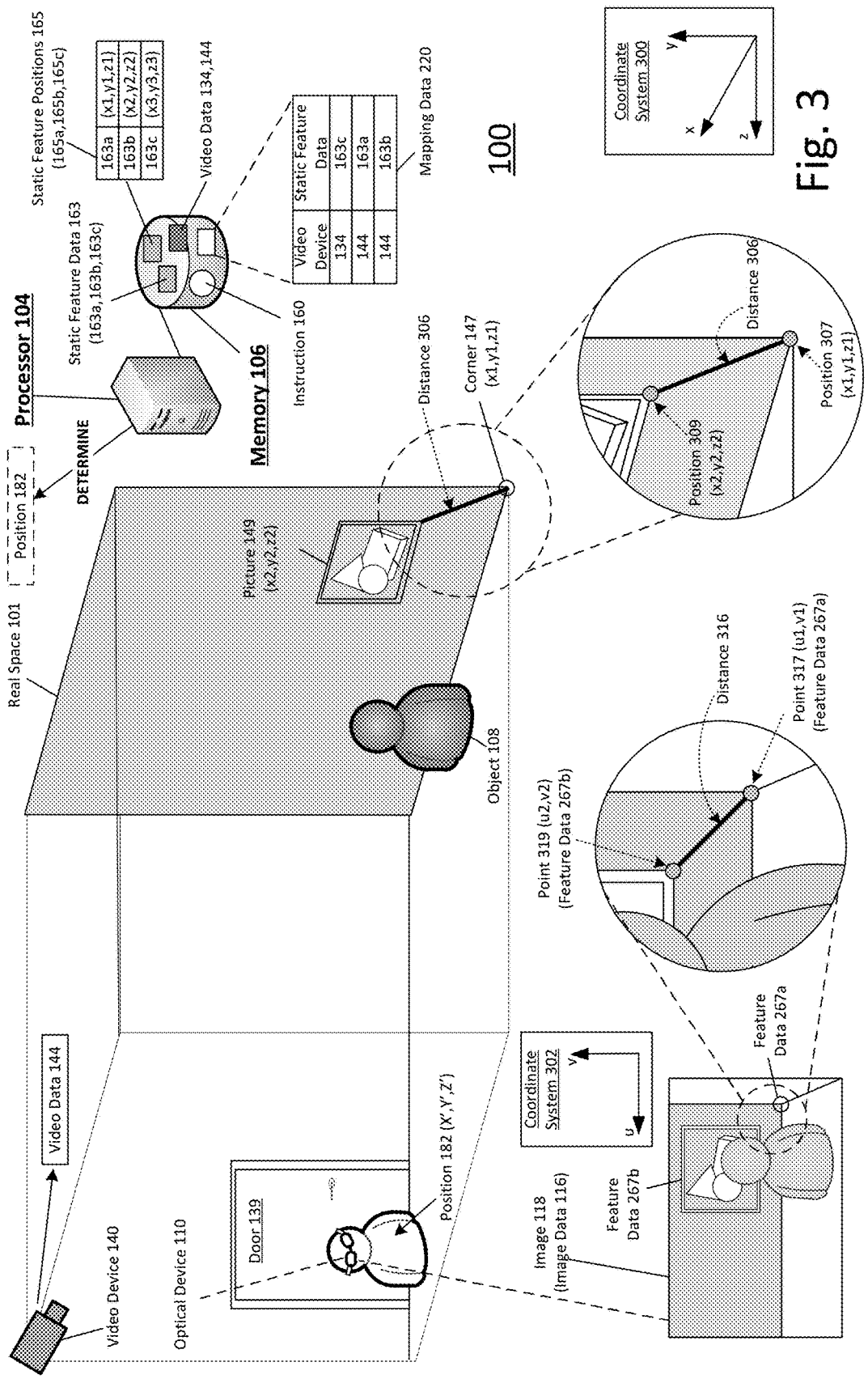
FIG. 3 illustrates the example system of FIG. 1 with additional detail relating to determination of a position of a photographer.

FIG. 3 illustrates the example system 100 of FIG. 1 with additional detail relating to determination of a position of a photographer, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Processor 104 may be configured to execute instruction 160, which may be stored in memory 106, to determine position 182 of photographer 112. Instruction 160 may include instructions effective for processor 104 to determine distances, such as a distance 306, between different static feature positions 165, which may be stored in memory 106. Instruction 160 may further include instructions effective for processor 104 to determine distances, such as a distance 316, between points, or different portions of feature data 267, in image data 116. Processor 104 may compare distance 306 with distance 316 and based on the comparison, may determine position 182.

In the example, in response to identification of feature data 267*a*, 267*b* from image data 116, processor 104 may retrieve static feature positions 165*a*, 165*b* from memory 106. Static feature position 165*a* may indicate that at least a portion of corner 147 may be located at position 307 of real space 101. Static feature position 165*b* may indicate that at least a portion of picture 149 may be located at position 309 of real space 101. Positions 182, 307, 309 may be coordinates in a coordinate system, such as coordinate system 300. In the example, positions 182, 307, 309, may be (X',Y',Z'), (x1, y1, z1) and (x2, y2, z2), respectively. In some examples, positions 307, 309, may indicate a center, an edge, a portion, etc., of corner 147 and picture 149, respectively. In the example, position 307 may indicate a center of corner 147, and position 309 may indicate a corner of picture 149. Processor 104 may execute instruction 160 to determine distance 306 between position 307 and position 309 in real space 101.

Also in response to identification of feature data 267*a*, 267*b* from image data 116, processor 104 may identify a point 317 and a point 319 in image data 116. Point 317 may be associated with a location of at least a portion of feature data 267*a* in image data 116. Point 319 may be associated with a location of at least a portion of feature data 267*b* in image data 116. Points 317, 319 may be coordinates in a two-dimensional coordinate system, such as coordinate system 302. In the example, points 317, 319, may be (u1, v1) and (u2, v2), respectively. In some examples, points 317, 319, may indicate a center, an edge, a portion, etc., of feature data 267*a* and feature data 267*b*, respectively. In the example, point 317 may indicate a center of feature data 267*a*, and point 319 may indicate a corner of feature data 367*b*. Processor 104 may execute instruction 160 to determine distance 316 between point 317 and point 319 of image data 116.

In response to the determination of distances 306, 316, processor 104 may execute instruction 160 to determine position 182 based on distances 306, 316. In some examples, instruction 160 may include instructions associated with triangulation techniques, such that processor 104 may determine position 182 based on an execution of the triangulation techniques. In some example, processor 104 may be configured to determine a ratio between distances 306, 316, and determine position 182 based on the ratio. In some examples, processor 104 may be configured to compare a perspective view of feature data 267 with an orientation of static feature data 163 in order to determine position 182.

Figure 4:
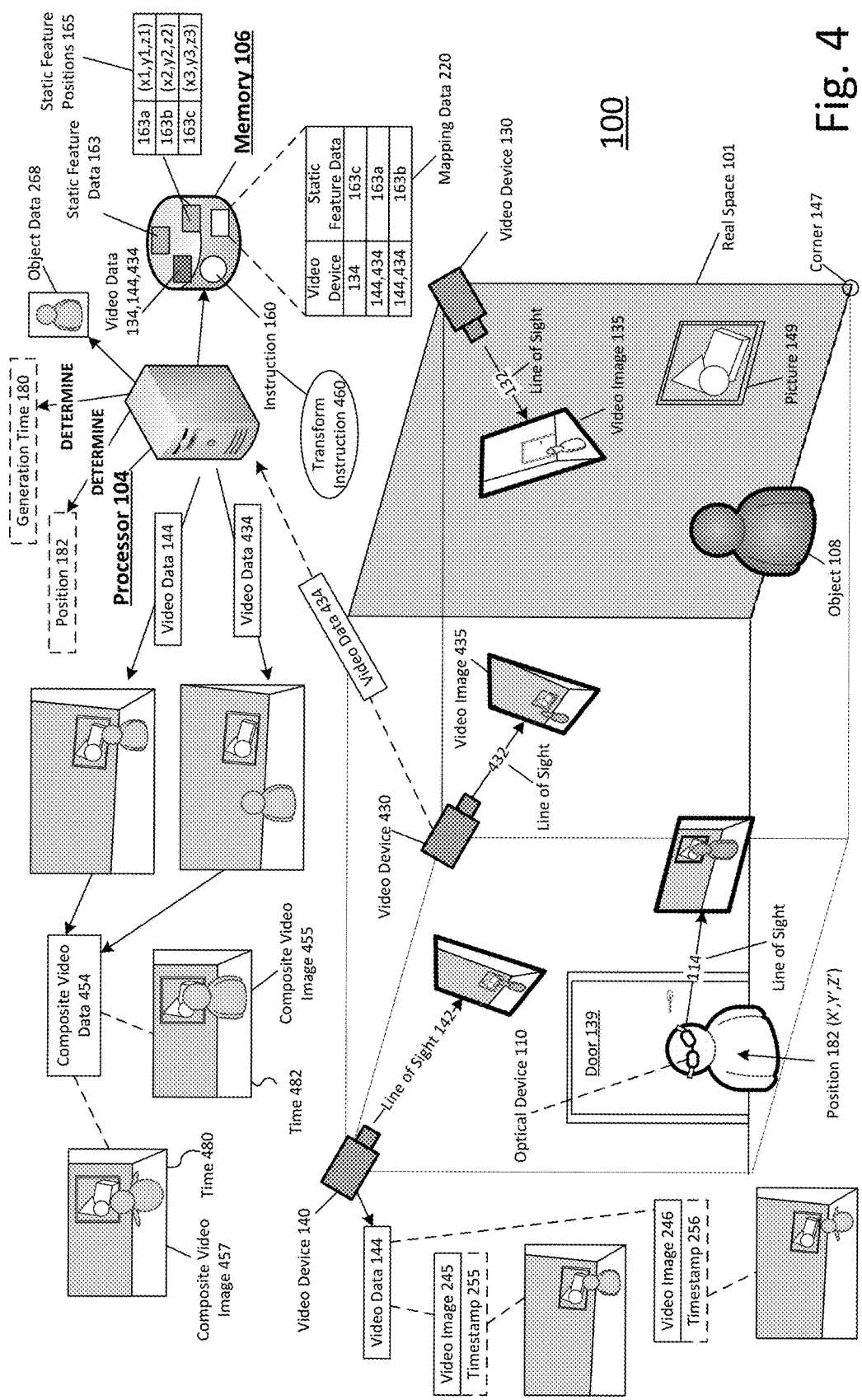
FIG. 4 illustrates the example system of FIG. 1 with additional detail relating to determination of a generation time and identification of a photographer.

FIG. 4 illustrates the example system 100 of FIG. 1 with additional detail relating to determination of a generation time and identification of a photographer, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity.

Processor 104 may determine generation time 180 based on position 182 and/or video data 134, 144. In some examples, image data 116 may include metadata that may include an indication of generation time 180. In some examples, image data 116 may include metadata that may exclude an indication of generation time 180. In some examples, processor 104 may determine generation time 180 based on video data that may include static feature data 163a, 163b, such as, in the example, video data 144. In some examples, processor 104 may determine generation time 180 based on more than one pieces of video data, where the video data may include feature data 267a, 267b. In response to determination of generation time 180, processor 104 may identify video data which may include a display of photographer 112, and may identify photographer 112 based on the identified video data.

In the example, system 100 may further include a video device 430 that may be configured to generate video data 434. Video device 430 may be configured to be in communication with processor 104, memory 106, and/or video devices 130, 140. Video device 430 may be configured to monitor a third section of real space 101 through a line of sight 432. Based on line of sight 432, video data 434 generated by video device 430 may correspond to a display of corner 147 and picture 149. Video data 434 may include one or more video images, such as a video image 435, and may include static feature data 163a, 163b. Mapping data 220 may further indicate that video data 434 may correspond to static feature data 163a, and 163b.

In an example, processor 104 may identify video data 144 based on a comparison of object data 268 with video data 144. Processor 104 may determine generation time 180 based on video data 144. Processor 104 may compare object data 268 with video data 144 to identify one or more video images, which may include video images 245, 246. In some examples, identified video images 245, 246 may be video images contiguous with each other during an output of video data 144, or may be video images not contiguous with each other during the output of video data 144. For example, video image 246 may be a next image to be displayed after a display of video image 245 during the output of video data 144. In another example, video image 246 may be, for example, a tenth image to be displayed after a display of video image 245 during the output of video data 144. In some examples, processor 104 may identify video images within different time range of video data 144. For example, if video data 144 is associated with a video that may span ten hours, timestamp 255 of video image 245 may be of a second hour of the video and timestamp 256 of video image 246 may be of a seventh house of the video.

In response to identification of video images 245, 246, processor 104 may compare object data 268 with video images 245, 246. In the example, a comparison of object data 268 with video image 246 may show a mismatch since object 108 is shown, in video image 246, in a different orientation and/or gesture from object data 268. A comparison of object data 268 with video image 245 may show a match since object 108 is shown, in video image 245, in a same orientation and/or gesture from object data 268. In some examples, processor 104 may compare attributes of object data 268 with attributes of video image 245, such as color, intensity, etc. Based on the comparison, processor 104 may determine that generation time 180 is same as the time indicated by timestamp 255.

In another example, processor 104 may identify video data 144, 434 based on a comparison of object data 268 with video data 144, 434. In another example, processor 104 may determine generation time 180 based on video data 144, 434. Instruction 160 stored in memory 106 may include a transform instruction 460 such as, for example, perspective transformation, camera transformation, orthogonal transformation, etc. Processor 104 may be configured to execute transform instruction 460 with video data 144, 434 to generate composite video data 454. Composite video data 454, when outputted on a display, may resemble a field of view of photographer 112 when photographer 112 is positioned at position 182. Composite video data 454 may include static feature data 163a, 163b, and may include composite video images 455, 457. Composite video images 455, 457 may be associated with times 480, 482.

In response to identification of composite video images 455, 457, processor 104 may compare object data 268 with composite video images 455, 457. A comparison of object data 268 with a composite video image may result in a match or a mismatch. In some examples, a match between object data 268 with a composite video image may indicate that a portion of the composite video image may be the same as object data 268. In some examples, a match between object data 268 with a composite video image may indicate that a portion of the composite video image may include a majority portion of object data 268, where the majority portion may be more than 50%, more than 60%, more than 70%, etc., of object data 268. In some examples, a mismatch between object data 268 with a composite video image may indicate that composite video image may not include portions which are same as object data 268. In the example, a comparison of object data 268 with composite video image 457 may show a mismatch since object 108 is shown, in composite video image 456, in a different orientation and/or gesture from object data 268. A comparison of object data 268 with composite video image 455 may show a match since object 108 is shown, in composite video image 455, in a same orientation and/or gesture from object data 268. Based on the comparison, processor 104 may determine that generation time 180 is same as the time 482 of composite video image 455.

With position 182 and generation time 180 determined, processor 104 may identify video data that may include a display of photographer 112. In the example, processor 104 may compare position 182 with static feature positions 165 stored in memory 106. Based on the comparison, processor 104 may determine that position 182 is relatively close to static feature data 163c (door 139). Processor 104 may analyze mapping data 220 to determine which video data may correspond to static feature data 163c. Processor 104 may identify video data 134 based on the analysis of mapping data 220. Processor 104 may identify a video image in video data 134 that associates with a time that may be same as generation time 180. In the example, processor 104 may identify video image 135 of video data 134. In an example, processor 104 may identify static feature data 163 in video image 135 and in response, may subtract static feature 163 from video image 135. As a result of the subtraction, the remaining portions of video image 135 may correspond to a display of photographer 112, or may include an indication, such as a display or an image, of photographer 112. In some examples, processor 104 may store image data of photographer 112 in memory 106 such that the image of photographer 112 may be used at a later instance to identify photographer 112. For example, memory 106 may store image data of frequent visitors in real space 101 and, in response, may compare the image data of frequent visitors with the image data of photographer 112 stored in memory 106 in order to identify photographer 112. In some examples, processor 104 may compare the image data of frequent visitors in real space 101 with the image data of photographer 112 based on facial recognition techniques.

Figure 5:
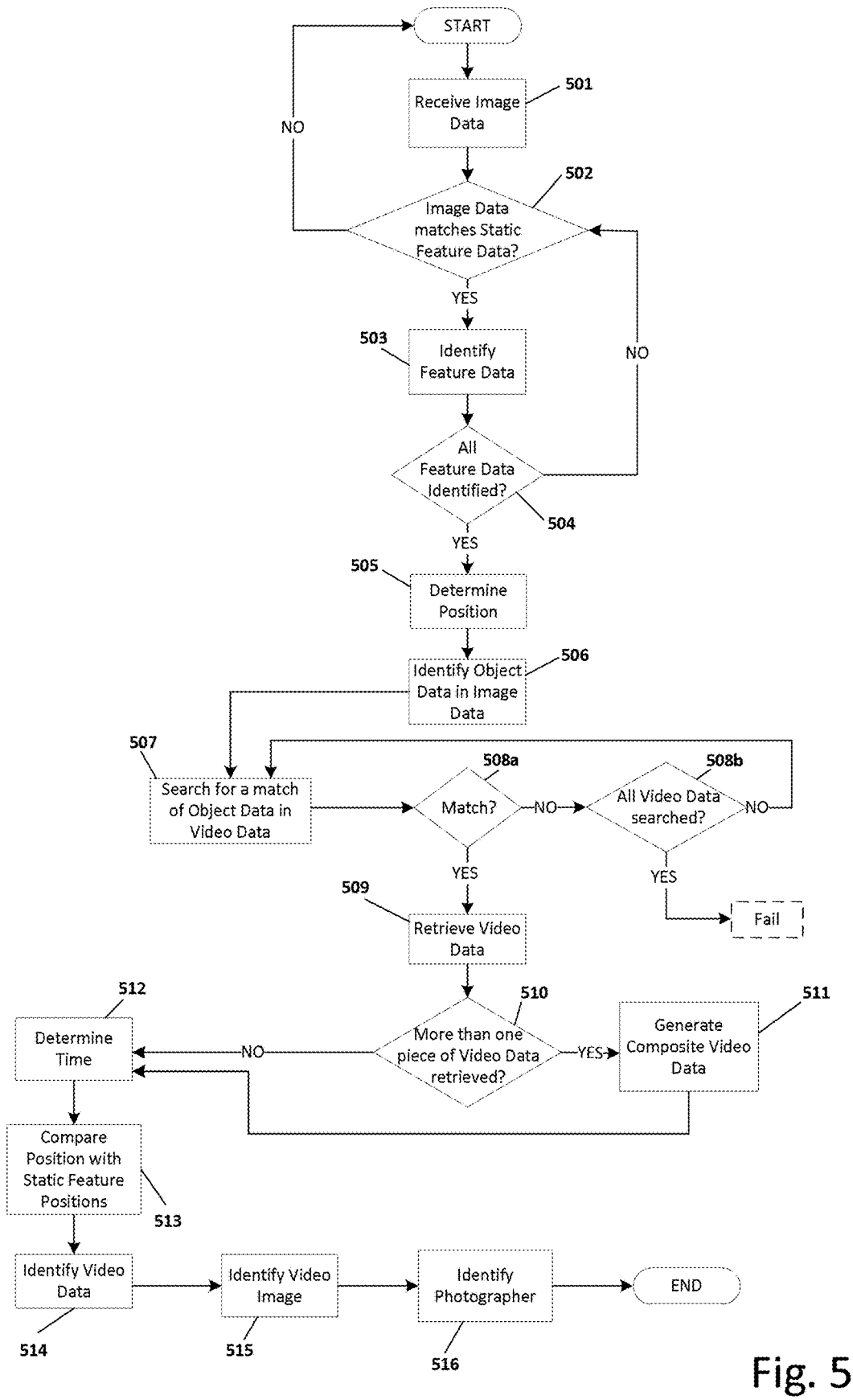
FIG. 5 illustrates a flow diagram for an example process for implementing identification of a photographer based on an image.

FIG. 5 illustrates a flow diagram for an example process for implementing identification of a photographer based on an image, arranged in accordance with at least some embodiments described herein. The process in FIG. 5 could be implemented using, for example, system 100 discussed above. The process of FIG. 5 may include one or more operations, actions, or functions as illustrated by one or more of blocks 501, 502, 503, 504, 505, 506, 507, 508a, 508b, 509, 510, 511, 512, 513, 514, 515, and/or 516. Although illustrated as discrete blocks, various blocks may be divided into additional blocks, combined into fewer blocks, or eliminated, depending on the desired implementation.

The process may start at block 501 "Receive Image Data", where a processor may receive image data associated with an image. The process may continue from block 501 to decision block 502 "Image Data matches Static Feature Data?". At decision block 502, the processor may compare the image data with static feature data that may be stored in a memory. In some examples, if the image data does not match with the static feature data, the processor may terminate the process. If the image data matches with the static feature data, the process may continue to decision block 502 to block 503 "Identify Feature Data". At block 503, in response to a match between the image data and the static feature data, the processor may identify feature data in the image data. The process may continue from block 503 to decision block 504 "All Feature Data Identified?". At decision block 504, the processor may check if all feature data of the image data has been identified. If there are more feature data to be identified, the processor may return to execute block 502 to continue to compare the image data with the static feature data. If all feature data in the image data has been identified, the process may continue from decision block 504 to block 505 "Determine Position" and block 506 "Identify Object Data in Image Data".

At block 505, the processor may determine a position of a photographer. Determination of the position of the photographer may be based on the identified feature data from the image data. The process may continue from block 505 to block 506 "Identify Object Data in Image Data". At block 506, the processor may identify object data, which may be associated with an object, in the image associated with the image data. In some examples, the processor may subtract the identified feature data from the image data to identify the object data. The process may continue from block 506 to block 507 "Search for a match of Object Data in Video Data". At block 507, the processor may determine if the identified object data is in video data generated by each video device of system 100. For example, the processor may search for the identified object data in video data generated by each video device of system 100. In some examples, a result of the search may indicate whether the searched video data includes data, such as pixels, that may match with the object data. The processor may continue from block 507 to decision block 508a "Match?" At decision block 508a, the processor may determine if a match has been found based on the search for the identified object data in the video data. If a match has been found in one or more pieces of video data, the process may continue from decision block 508a to block 509. If no match is found based on the search for the identified object data in the video data, the process may continue from decision block 508a to decision block 508b "All Video Data searched?" At decision block 508b, the processor may determine if all video data generated from each video device in system 100 has been searched. If there are more video data to be searched, the process may return to block 507 to continue the search for a match of the object data. If none of the search video data includes a match with the object data, then the system may indicate a failure and may return to the Start of the process. In some examples, the failure may indicate that a generation time of the image data may not be determined due to the failure to find the object data in all video data.

At block 509, the processor may retrieve all video data that includes data which matches the object data from the memory that includes the video data. The process may continue from block 509 to decision block 510 "More than one piece of Video Data retrieved?". At decision block 510, the processor may check if there are more than one pieces of video data retrieved as a result of blocks 509. If one piece of video data is retrieved by the processor, the process may continue from decision block 510 to block 512 "Determine Time". If more than one pieces of video data are retrieved by the processor, the process may continue from decision block 510 to block 511 "Generate Composite Video Data".

At block 511, the processor may generate composite video data based on the retrieved video data. The process may continue from block 511 to block 512 "Determine Time". At block 512, the processor may determine a time associated with the generation time of the image data. Determination of the time may be based on the determined position, the retrieved video data and/or the generated composite video data. The process may continue from block 512 to block 513 "Compare Position with Static Feature Positions". At block 513, the processor may compare the position of the photographer with static feature positions, which may be stored in a memory. The process may continue from block 513 to block 514 "Identify Video Data". At block 514, the processor may identify video data, which may be same of different from the retrieved video data, based on the comparison of the determined position with the static feature positions. The process may continue from block 514 to block 515 "Identify Video Image". At block 515, the processor may identify a video image in the identified video data based on the determined time. The process may continue from block 515 to block 516 "Identify Photographer". At block 516, the processor may identify the photographer based on the identified video image.

Among other possible benefits, a system in accordance with the disclosure may benefit a person in a photo that was distributed in social media without the person's knowledge or consent. The system in accordance with the disclosure may allow the person to track a photographer who took the photo. Also, the system in accordance with the disclosure may benefit owners or managers of a location such as a restaurant or a museum where cameras are prohibited. For example, a particular exhibit in a museum may set up rules to prohibit use of cameras. A visitor to the museum may violate the rules and may take a photo of the exhibit, and may distribute the photo publicly such as through social media. The owner or manager of the museum may identify the visitor based on the photo in order to restrict the visitor from visiting the museum in the future.

Figure 6:
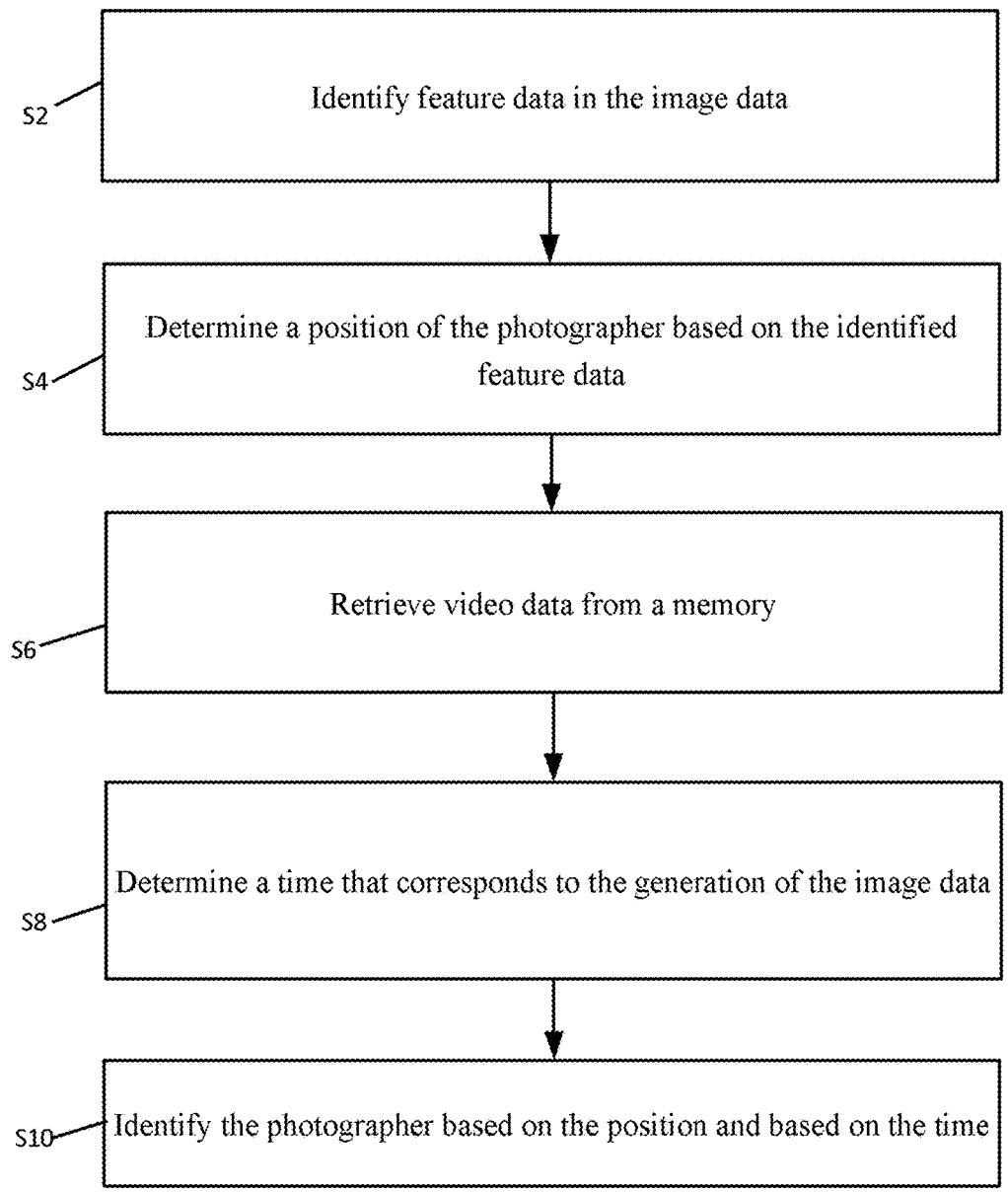
FIG. 6 illustrates a flow diagram for an example process for implementing identification of a photographer based on an image.

FIG. 6 illustrates a flow diagram for an example process for implementing identification of a photographer based on an image, arranged in accordance with at least some embodiments presented herein. The process in FIG. 6 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Identify feature data in the image data". At block S2, a processor may identify feature data in a piece of image data that may be associated with an image generated by a device. The feature data may correspond to a static feature in a real space, such as, for example, a restaurant. In some examples, the processor may identify the feature data in the image data based on a comparison between the image data and a set of static feature data. The set of static feature data may be generated by the processor.

Processing may continue from block S2 to block S4, "Determine a position of the photographer based on the identified feature data". At block S4, the processor may determine a position of a photographer based on the identified feature data from the image data. The photographer may be associated with the device and/or the image data. In some examples, the processor may identify more than one piece of feature data in the image data. The processor may determine a first distance between first feature data and second feature data in the image data. The processor may further determine a second distance between first static feature data and second static feature data. The processor may further determine the position of the photographer based on the first distance and based on the second distance.

Processing may continue from block S4 to block S6, "Retrieve video data from a memory". At block S6, the processor may retrieve video data from a memory. The video data may include the feature data. In some examples, generation of the static feature data may include identifying first video image data and second video image data from the video data, and in response, determining a difference between the first and second video image data.

Processing may continue from block S6 to block S8, "Determine a time that corresponds to the generation of the image data". At block S8, the processor may determine a time that may correspond to a generation of the image data. The determination of the time may be based on the video data. In some examples, the processor may identify object data in the image data, where the object data may be associated with an object in the image. The processor may identify two or more pieces of video image data in the video data. The processor may compare the object data with the two or more pieces of video image data, and may determine the time based on the comparison. In some examples, the processor may identify first and second video data and may generate composite video data based a combination of the first and second video data. The processor may determine the time based on the composite video data.

Processing may continue from block S8 to block S10, "Identify the photographer based on the position and based on the time". At block S10, the processor may identify the photographer based on the position and based on the time. In some examples, the processor may identify a particular static feature based on the position. The processor may identify a particular video data based on the particular static feature. The processor may further identify a particular video image data from the particular video data based on the time, where the particular video image data may include an indication of the photographer.

Figure 7:
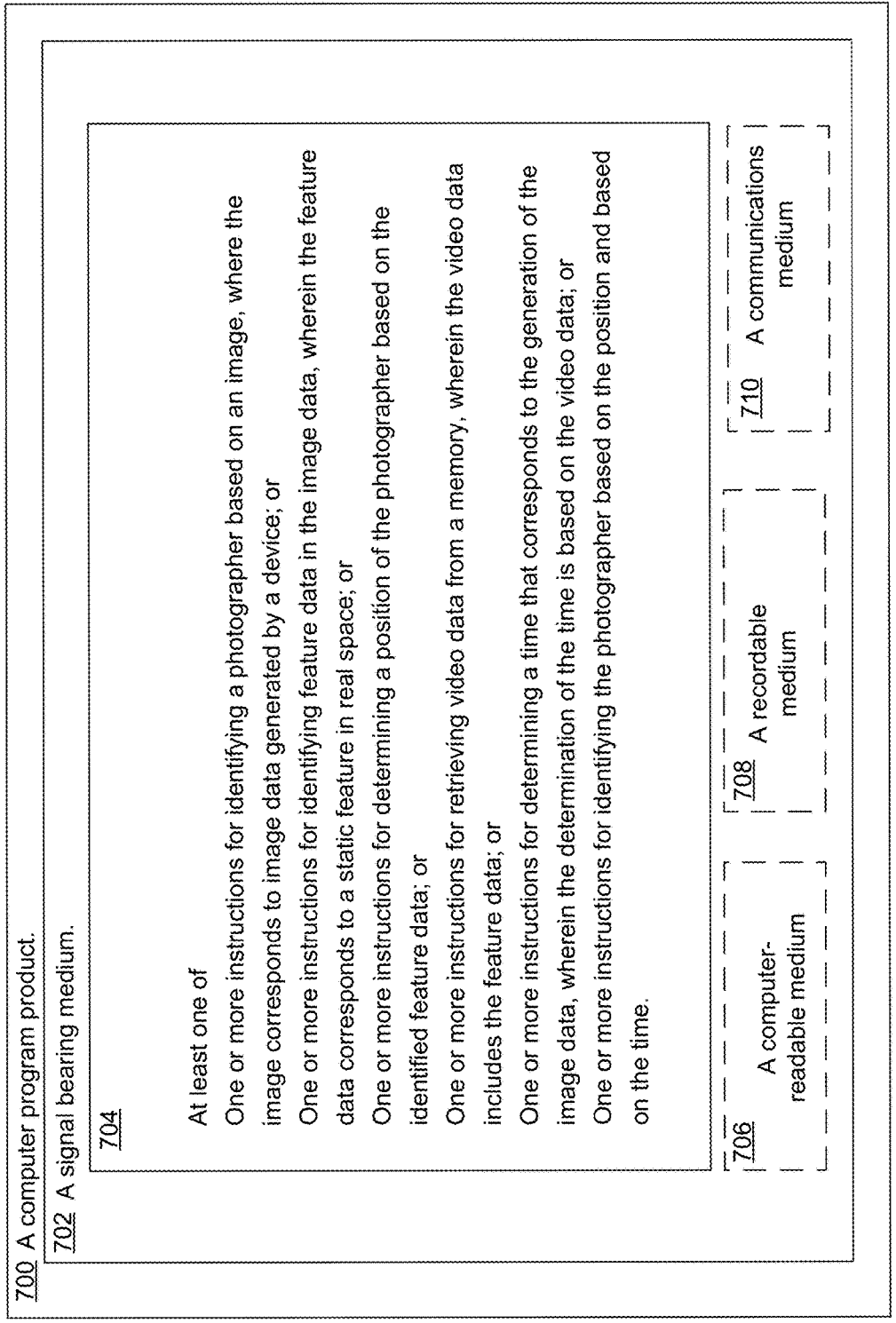
FIG. 7 illustrates an example computer program product that can be utilized to implement identification of a photographer based on an image.

FIG. 7 illustrates an example computer program product that can be utilized to implement identification of a photographer based on an image, arranged in accordance with at least some embodiments described herein. Computer program product 700 may include a signal bearing medium 702. Signal bearing medium 702 may include one or more instructions 704 that, when executed by, for example, a processor, may provide the functionality described above with respect to FIGS. 1-6. Thus, for example, referring to system 100, processor 104 may undertake one or more of the blocks shown in FIG. 5 and FIG. 6 in response to instructions 704 conveyed to the system 100 by signal bearing medium 702.

In some implementations, signal bearing medium 702 may encompass a computer-readable medium 706, such as, but not limited to, a hard disk drive (HDD), a Compact Disc (CD), a Digital Video Disc (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, computer program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

FIG. 8 is a block diagram illustrating an example computing device that is arranged to implement identification of a photographer based on an image, arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a photographer identification algorithm 826 that is arranged to perform the functions as described herein including those described with respect to system 100 of FIGS. 1-6. Program data 824 may include photographer identification data 828 that may be useful for implementation of identification of a photographer based on an image as is described herein. In some embodiments, application 822 may be arranged to operate with program data 824 on operating system 820 such that implementations of identification of a photographer based on an image may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disc (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile discs (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to identify a photographer based on an image, wherein the image corresponds to image data generated by a device, the method comprising, by a processor:
    identifying first feature data in the image data, wherein the first feature data corresponds to a first static feature in real space;
    identifying second feature data in the image data, wherein the second feature data corresponds to a second static feature in the real space;
    determining a first distance between the first feature data and the second feature data in the image data;
    determining a second distance between the first static feature and the second static feature in the real space;
    determining a position of the photographer based on the first distance and the second distance;
    retrieving video data from a memory, wherein the video data includes the first feature data;
    determining a time that corresponds to the generation of the image data, wherein the determination of the time is based on the video data; and
    identifying the photographer based on the position and the time.

2. The method of claim 1, wherein identifying the first feature data includes comparing the image data with a set of static feature data.

3. The method of claim 1, wherein the video data is first video data, and the method further comprises, prior to identifying the first feature data:
    retrieving second video data that includes first video image data and second video image data, wherein the first video image data includes first static feature data of the first static feature at a first instance in time, and wherein the second video image data includes second static feature data of the first static feature at a second instance in time;
    determining a difference between the first video image data and the second video image data; and
    identifying the first feature data based on the difference.

4. The method of claim 3, wherein the second video data is different from the first video data.

5. The method of claim 3, wherein determining the difference includes subtracting the second video image data from the first video image data.

6. The method of claim 1, wherein the image data includes augmented reality object data, and the image includes augmented reality objects associated with the augmented reality object data.

7. The method of claim 1, further comprising:
    prior to retrieving the video data from the memory, identifying object data in the image data, wherein the object data corresponds to a dynamic object;
    comparing the object data with a set of two or more pieces of video data to identify the video data, wherein retrieving the video data from the memory is performed in response to the identification of the video data;
    after retrieving the video data from the memory, comparing the object data with the video data; and
    in response to the comparison, identifying video image data in the video data, wherein the identified video image data includes the object data, and wherein the determination of the time is further based on the identified video image data.

8. The method of claim 7, wherein identifying the object data in the image data includes subtracting the first feature data from the image data.

9. The method of claim 7, wherein the image data includes augmented reality object data, and identifying the object data in the image data further includes subtracting the augmented reality object data from the image data.

10. The method of claim 7, wherein the video data is first video data, and the method further comprises:
comparing the object data with the set of two or more pieces of video data to identify second video data, wherein the second video data corresponds to the first static feature;
retrieving the second video data from the memory;
combining the first video data and the second video data to generate composite video data;
comparing the object data with the composite video data; and
based on the comparison of the object data with the composite video data, identifying composite video image data in the composite video data, wherein the composite video image data includes the object data, and wherein the determination of the time is further based on the identified composite video image data.

11. The method of claim 1, wherein the video data is first video data, and identifying the photographer includes:
identifying a third static feature based on the position of the photographer;
identifying second video data based on the third static feature; and
identifying video image data from the second video data based on the time, wherein the video image data includes an indication of the photographer.

12. The method of claim 11, further comprising identifying the photographer by an application of a facial recognition technique on the indication of the photographer.

13. The method of claim 11, further comprising:
storing the video image data, that includes the indication of the photographer, in the memory; and
identifying the photographer based on an application of a facial recognition technique on the stored video image data.

14. A system effective to identify a photographer based on an image that corresponds to image data generated by a device, the system comprising:
a video device configured to generate video data;
a memory configured to store the video data;
a processor configured to be in communication with the memory and the video device, wherein the processor is configured to:
identify first feature data in the image data, wherein the first feature data corresponds to a first static feature in real space;
identify second feature data in the image data, wherein the second feature data corresponds to a second static feature in the real space;
determine a first distance between the first feature data and the second feature data in the image data;
determine a second distance between the first static feature and the second static feature in the real space;
determine a position of the photographer based on the first distance and the second distance;
retrieve the video data from the memory, wherein the video data includes the first feature data;
determine a time that corresponds to the generation of the image data, wherein the determination of the time is based on the video data; and
identify the photographer based on the position and the time.

15. The system of claim 14, wherein:
the memory is further configured to store a set of static feature data that corresponds to a set of static features; and
the processor is further configured to compare the image data with the set of static feature data to identify the first feature data.

16. The system of claim 14, wherein the video data is first video data, and the processor is further configured to:
retrieve second video data that includes first video image data and second video image data, wherein the first video image data includes first static feature data of the first static feature at a first instance in time, and wherein the second video image data includes second static feature data of the first static feature at a second instance in time;
subtract the second video image data from the first video image data to determine a difference;
identify the first feature data based on the difference; and
store the first feature data in the memory.

17. The system of claim 14, wherein the image data includes augmented reality object data, and the image includes augmented reality objects associated with the augmented reality object data.

18. The system of claim 14, wherein the memory is further configured to store a set of two or more pieces of video data, and the processor is further configured to:
prior to retrieval of the video data from the memory, subtract the first feature data from the image data to identify object data in the image data, wherein the object data corresponds to a dynamic object in the real space;
compare the object data with the set of two or more pieces of video data to identify the video data, wherein retrieval of the video data from the memory is performed in response to the identification of the video data;
after retrieval of the video data from the memory, compare the object data with the video data; and
based on the comparison of the object data with the set of two or more pieces of video data, identify video image data in the video data, wherein the video image data includes the object data, and wherein the determination of the time is further based on the identified video image data.

19. The system of claim 18, wherein the image data includes augmented reality object data, and the processor is further configured to subtract the augmented reality object data from the image data to identify the object data in the image data.

20. The system of claim 18, wherein the video data is first video data, and the processor is further configured to:
compare the object data with the set of two or more pieces of video data to identify second video data, wherein the second video data corresponds to the first static feature;
in response to the identification of the second video data, retrieve the second video data from the memory;
combine the first video data and the second video data to generate composite video data;
store the composite video data in the memory;
compare the object data with the composite video data; and
based on the comparison of the object data with the composite video data, identify composite video image data in the composite video data, wherein the composite video image data includes the object data, and wherein the determination of the time is further based on the identified composite video image data.

21. The system of claim 14, wherein the video data is first video data, and the processor is further configured to:
   identify a third static feature based on the position of the photographer;
   identify second video data based on the third static feature; and
   identify video image data from the second video data based on the time, wherein the video image data includes an indication of the photographer.

22. A first device effective to identify a photographer based on an image that corresponds to image data generated by a second device, the first device comprising:
   a memory;
   a processor configured to be in communication with the memory, wherein the processor is configured to:
   receive video data;
   store the video data in the memory;
   identify feature data in the image data, and the feature data corresponds to a static feature in real space;
   determine a position of the photographer based on the identified feature data;
   subtract the feature data from the image data to identify object data in the image data, wherein the object data corresponds to a dynamic object in the real space;
   compare the object data with the video data;
   based on the comparison of the object data with the video data, identify video image data in the video data, wherein the video image data includes the object data;
   determine a time that corresponds to the generation of the image data, wherein the determination of the time is based on the identified video image data; and
   identify the photographer based on the position and the time.

23. The first device of claim 22, wherein:
   the memory is further configured to store a set of static feature data that corresponds to a set of static features; and
   the processor is further configured to compare the image data with the set of static feature data to identify the feature data.

\* \* \* \* \*

UNITED STATES PATENT AND TRADEMARK OFFICE
CERTIFICATE OF CORRECTION

PATENT NO. : 9,836,650 B2  
APPLICATION NO. : 14/617165  
DATED : December 5, 2017  
INVENTOR(S) : Ur et al.

It is certified that error appears in the above-identified patent and that said Letters Patent is hereby corrected as shown below:

In the Specification

In Column 11, Line 9, delete "feature 163" and insert -- feature data 163 --, therefor.

Signed and Sealed this
Nineteenth Day of June, 2018

Andrei Iancu
*Director of the United States Patent and Trademark Office*